(12) United States Patent
Kimura

(10) Patent No.: US 7,946,710 B2
(45) Date of Patent: May 24, 2011

(54) PROJECTION DISPLAY

(75) Inventor: Nobuyuki Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 883 days.

(21) Appl. No.: 11/740,333

(22) Filed: Apr. 26, 2007

(65) Prior Publication Data

US 2007/0279594 A1 Dec. 6, 2007

(30) Foreign Application Priority Data

May 30, 2006 (JP) ................. 2006-149109

(51) Int. Cl.
G03B 21/26 (2006.01)
(52) U.S. Cl. .......................................... 353/34
(58) Field of Classification Search .......... 353/30, 353/31, 70, 20, 33, 34, 81; 359/210.1, 434, 359/490, 634; 348/339
See application file for complete search history.

(56) References Cited

U.S. PATENT DOCUMENTS

2006/0098128 A1* 5/2006 Conner et al. ................ 349/5
2007/0035702 A1* 2/2007 Shimizu et al. .............. 353/34

FOREIGN PATENT DOCUMENTS

JP 2004-226814 8/2004
* cited by examiner

Primary Examiner — Georgia Y Epps
Assistant Examiner — Don Williams
(74) Attorney, Agent, or Firm — Antonelli, Terry, Stout & Kraus, LLP.

(57) ABSTRACT

A projection display, for modulating lights into an optical image through an image display element, thereby projecting the optical image from a projection lens, enlargedly, comprising: a light source, which is configured to emit the lights; an optical integrator, which is configured to equalize illuminance distribution of the lights from the light source; a color separation optic system, which is configured to separate the lights emitted from the optical integrator into a plural number of light components; a relay optic system having a plural number of relay lenses, each of which is configured to relay the light separated by the color separation optic system; and a rotation adjuster, which is provided in at least any one of the plural number of relay lenses, and configured to adjust an inclination angle thereof, with respect to a light axis of the lights emitted from the light source.

14 Claims, 12 Drawing Sheets

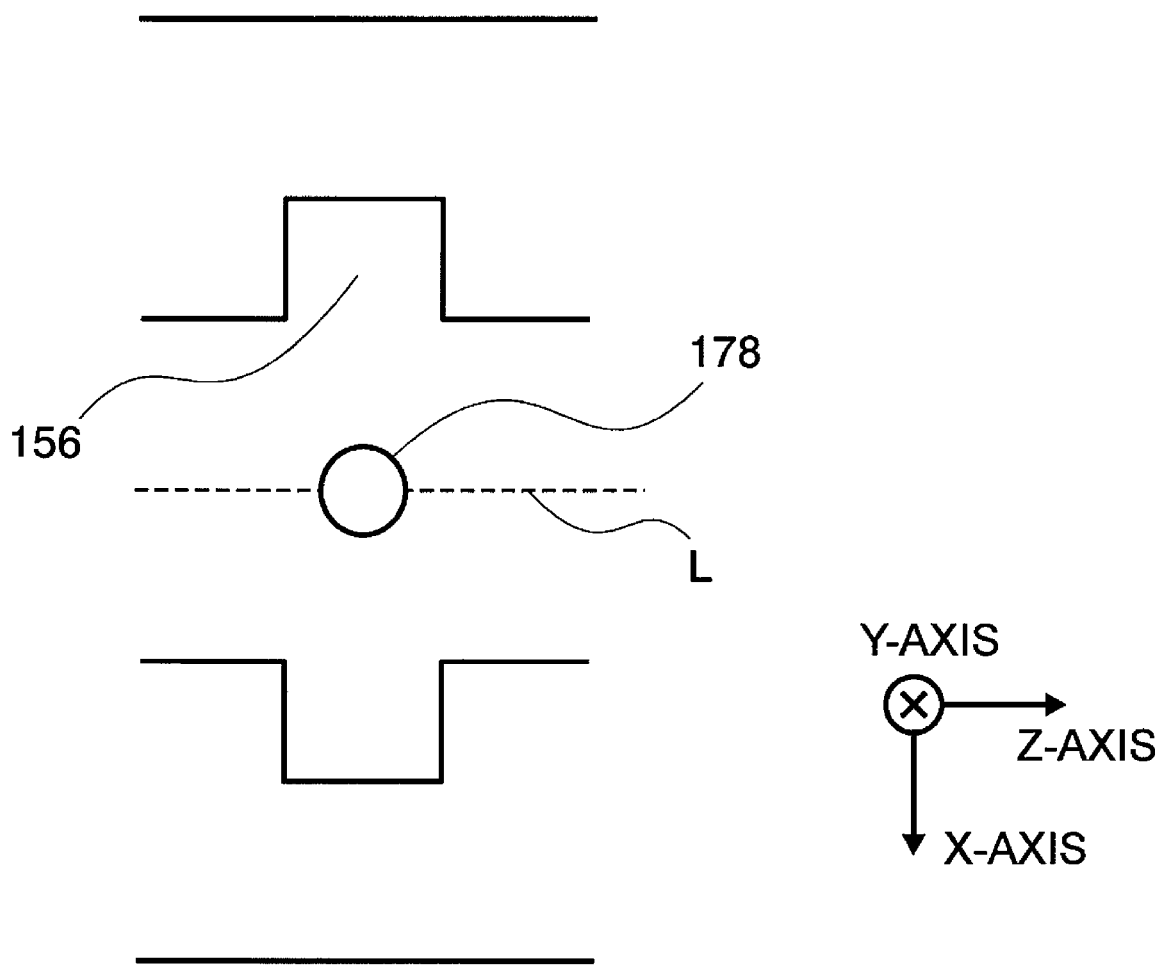

PROJECTION DISPLAY

BACKGROUND OF THE INVENTION

The present invention relates to a projection display, and it relates, in particular, to a projection display characterized by including a rotation adjuster for adjusting an offset in illuminance distribution on a light source side.

Within the projection display of three (3) plate type, the optical distance of an optical path (hereinafter, being called an "optical path length") differs from, for each of light components, being separated in the color, to reach onto a liquid crystal panel corresponding thereto, and at least one of the optical path lengths of the color component lights is longer, comparing to that of the other color component lights. Then, adjustment or compensation in the optical path length is achieved with using a relay optic system on the optical path for the color component light(s) being long in the optical path length(s) thereof.

However, with such the relay optic system, since the light emitting from the light source propagates while reversing up/down (i.e., vertically) and left/right (i.e., horizontally), then there occurs a case that the color component light irradiating upon the liquid crystal panel passing through the relay optic system and the color component light irradiating upon the liquid crystal panel without passing through the relay optic system are opposite to each other, up/down (vertically) and left/right (horizontally), in particular, on the illuminance distributions thereof.

In this instance, if there is an offset or deviation in the illuminance distribution on the light source side, there is a possibility that color unevenness is generated on a display screen. The offset of illuminance distribution on the light source side is generated due to various factors. Thus, due to offset or deviation in positions and/or configurations of elements for converting polarized lights (i.e., polarized light converter elements), which are provided within a light source and/or an optical integrator, there are cases that the illuminance distribution be asymmetric up/down (vertically) and left/right (horizontally), on the emission light from that polarized light converter element(s).

For example, in case when the polarized light converter element has an opening configuration of being vertically long (herein, "vertically" means the direction in parallel with a short side of the liquid crystal panel having rectangular shape), then the left/right direction is at the highest on frequency of generating the uneven irradiation (herein, "left/right" means the direction in parallel with a long side of that rectangular-shaped liquid crystal panel, i.e., the horizontal direction).

Herein, although the optical path length of a light in a blue color zone (hereinafter, being "B-light"), the optical path length of a light in a red color zone (hereinafter, being "R-light") and the optical path length of a light in a green color zone (hereinafter, being "G-light") differ from one another, but in case where there no color unevenness is generated on the display screen since there is no offset or dispersion in the illuminance distribution on the light source side, then as is shown in FIG. 6(a), shapes of the illuminance distributions are nearly equal to one another among the R-light, G-light and B-light, respectively, on the liquid crystal panel, and there is no chance that on a portion of one color having a weak light irradiation is projected on a portion of other color having strong irradiation to build up a picture; i.e., there is no chance of generating the color unevenness on the display screen. The vertical axis in FIG. 6(a) shows a potion in the width direction on the liquid crystal panel, while the vertical axis the height or intensity of illuminance at the position in the width direction on the liquid crystal panel.

On the contrary to this, in case when the optical path length of the B-light differs from those of the R-light and the G-light, and thereby causing the offset or dispersion of the illuminance distribution on the light source side, then as shown in FIG. 6(b), the illuminance distributions of the R-light and the G-light irradiating upon the liquid crystal panel through a non-relay optic system differs from the illuminance distribution on the liquid crystal panel of the B-light. For this reason, strong illuminance portions of the R-light and the G-lights are projected on a weak illuminance portion of the B-light, and also a strong illuminance portion of the B-light is projected on weak illuminance portions of the R-light and the G-lights; thereby generating the color unevenness on the display screen.

Then, in Japanese Patent Laying-Open No. 2004-226814 (2004), for example, there is proposed a technology for bringing the configuration of illuminance distribution on the liquid crystal panel of the B-light to be equal to those of the illuminance distributions of the R-light and the G-light, while disposing a light shielding means at an end portion of a relay lens building up the relay optic system, so as to shield a portion of the B-light.

BRIEF SUMMARY OF THE INVENTION

However, in this case, as is shown in FIG. 6(c), an intensity of the B-light is reduced down, greatly (i.e., the illuminance distribution before light shielding is shown by a dotted line, and that after light shielding by a solid line). For this reason, it is impossible to keep color balance, and there is brought about a problem that a color purity is deteriorated, in particular, of a white color, which is obtained by filing up the R-light, the G-light and the B-light.

The present invention, by taking the situation of the conventional technology mentioned above into the consideration thereof, an object thereof is to provide a projection display for lowering the color unevenness, but not deteriorating the color purity of white color.

For dissolving such the problem as mentioned above, according to the present invention, the projection display comprises a rotation adjuster for enabling to adjust the illuminance distribution of colors of the lights, which are relayed by means of the relay optic system.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 2(b) is an upper view for showing the principle portion of the rotation adjuster for the first relay lens, along the Y-axis direction;

DETAILED DESCRIPTION OF THE PREFERRED EMBODIMENTS

Figure 1:
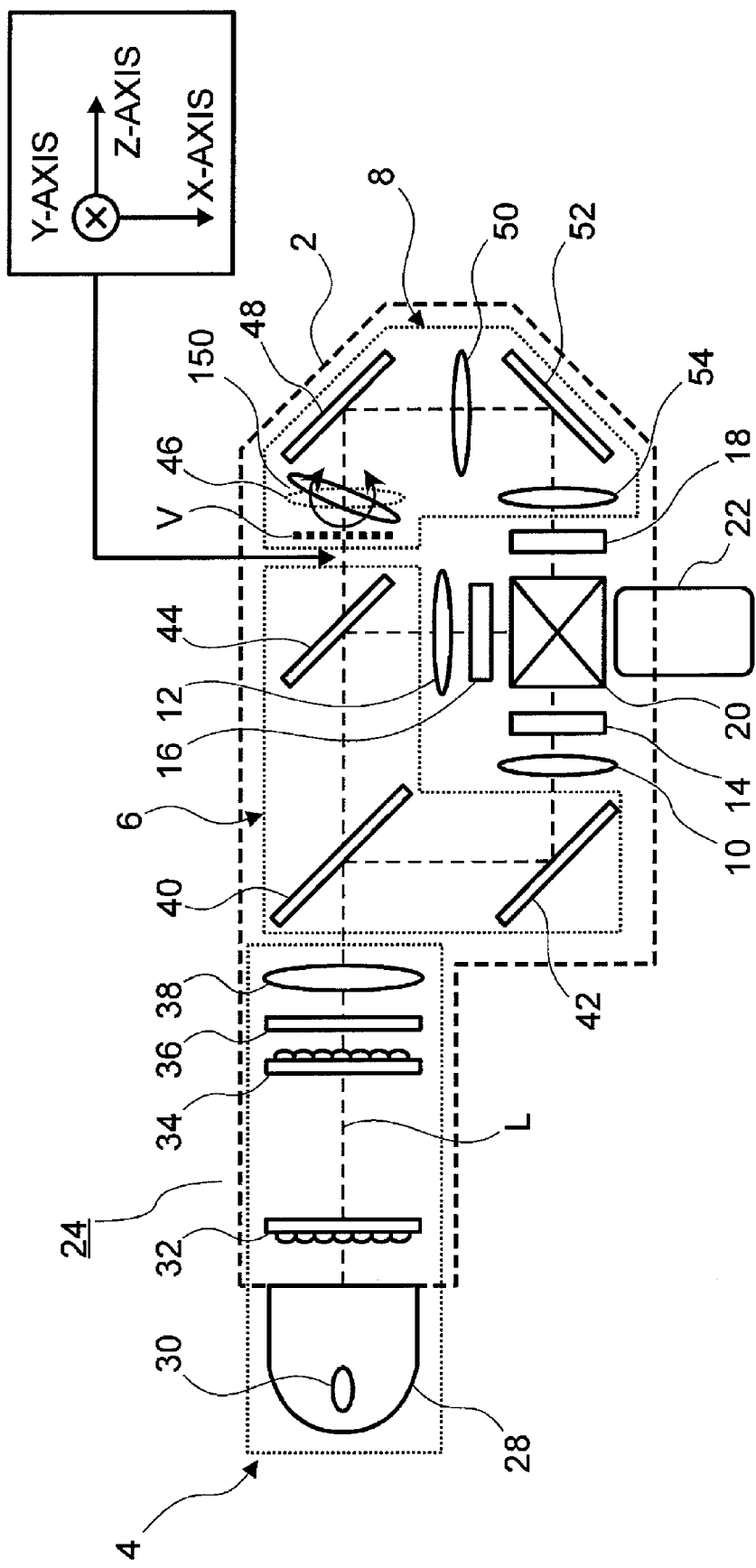
FIG. 1 is a block diagram of an optic system of a projection display, according to the present invention.

Hereinafter, embodiments according to the present invention will be fully explained, by referring to the attached drawings. However, the present invention should not be restricted to those, which will be illustrated below, and within each of the drawings, an equal or similar portion is attached with the same reference numeral, so as to omit the explanation thereof.

FIG. 1 is a block diagram of an optic system of a projection display, according to a present embodiment. Herein, as a picture display element is applied a liquid crystal panel therein.

As is shown in FIG. 1, the optic system of the projection display 1 comprises an illumination optic system 4 attached on a base 2, a color separation optic system 6, a relay optic system 8, two (2) pieces of condenser lenses 10 and 12, three (3) pieces of liquid crystal panels 14, 16 and 18, and a projection lens 22.

And, those optical elements are attached on the base 2, so as to build up an optical unit 24, and that optical unit 24 is installed within a housing not shown in the figure, together with a driver circuit (not shown in the figure) for driving the liquid crystal panels and an electric power source circuit (not shown in the figure); thereby building up the projection display 1.

Within the illumination optic system 4 is provided a lamp 30, as a light source, being received within a reflector 28. There is no restriction in the shape of the reflector 28, but it is so arranged to cover the lamp 30 from a rear side thereof, and thereby providing a reflection surface in the form of paraboloid of revolution. Also, in a direction of the light emitting from the reflector 28 is formed a polygonal emission opening. As the lamp 30 may be applied a white light lamp, for example, an supper-high pressure mercury lamp, a metal halide lamp, a xenon lamp, a mercury-xenon lamp, a halogen lamp, etc.

In the direction of the lights emitted from the reflector 28 is disposed a first array lens 32, and on a light emitting surface side of this first array lens is disposed a second array lens 34. Also, on a light emitting surface side of the second array lens 34 is disposed a polarized light converting element 36.

The first array lens 32 is made of a plural number of lens cells, each having a rectangular configuration seeing from the direction, into which the illumination light axis L extends, and being disposed in a matrix-like (or two-dimensional) manner, and it separates or divides a light entering from the light source into a plural number of lights by means of the plural number of lens cells, thereby to guide them passing through the second array lens 34 and the polarized light converting element 36, effectively. Thus, the first array lens 32 is so designed that the lamp 30 and each lens cell of the second array lens are in the optically conjugated relationship.

The second array lens 34 is also made of a plural number of lens cells, each having a rectangular configuration seeing from the direction in which the illumination light axis L extends and being disposed on one of the lens surfaces thereof, in the similar manner to the first array lens, and each of the lens cells of this second array lens 34 projects the configuration of the corresponding lens cell building up the first array lens 32, respectively, on the liquid crystal panels 14, 16 and 18.

The polarized light converting element 36 aligns the lights emitted from the second array lens 34 into a predetermined direction of polarization.

On a light emitting surface side of the polarized light converting element 36 is disposed a condenser lens 38. Since it is so designed that each lens cell of the first array lens 32 is in optically conjugated relationship with the liquid crystal panels 14, 16 and 18, then the light fluxes divided into plural numbers thereof on the first array lens 32 are piled up, upon the liquid crystal panels 14, 16 and 18, respectively, by the function of the second array lens 34 and the condenser lens 38, to be projected; i.e., enabling an illumination with high uniformity or equalization of the illuminance distribution thereof, and thereby causing no problem from a practical viewpoint.

And, the illumination optic system 4 comprises the lamp 30, the first array lens 32, the second array lens 34, the polarized light converting element 36 and the condenser lens 38, while an optical integrator comprises the first array lens 32, the second array lens 34, the polarized light converting element 36 and the condenser lens 38.

Also, a polarized light converting integrator has an optical integrator including the first array lens 32 and the second array lens, for obtaining a uniform or equalized illumination, and the polarized light converting element 36 of a polarized light beam splitter array, for aligning the direction of the polarized light into a predetermined direction of the polarized light. And, with the function of this polarized light converting integrator, it is possible to obtain the uniform or equalized illumination upon the liquid crystal panels, with aligning the lights having random polarization direction, which are emitted from the light source, into the lights having a predetermined polarization direction.

On the light emitting surface side of the condenser lens 38 is disposed a dichroic mirror 40. The dichroic mirror 40 reflects the R-light thereupon while transmitting the G-light and the B-light therethrough.

In the direction of propagation of the R-light reflected upon the dichroic mirror 40 is disposed a reflection mirror 42, and in the direction of propagation of the R-light reflected upon the reflection mirror 42 is disposed the condenser lens 10. The condenser lens 10 condenses the R-light, and on the light emitting surface side of the condenser lens 10 is disposed the liquid crystal panel 14, i.e., an image display element. On the light emitting surface side of the liquid crystal panel 14, there is disposed a color synthesizing prism 20.

Also, in the direction of propagation of the G-light and the B-light transmitting through the dichroic mirror 40 is disposed the dichroic mirror 44. This dichroic mirror 44 reflects the G-light thereupon, and transmits the B-light therethrough. In the direction of propagation of the G-light reflected upon the dichroic mirror 44 is disposed the condenser lens 12, and in the direction of the G-light emitting surface of the condenser lens 12 is disposed the liquid crystal panel 16. And, on the light emitting surface side of the liquid crystal panel 16 for use of the G-light is disposed the color synthesizing prism 20.

In the direction of propagation of the B-light transmitting through the dichroic mirror 44, there is disposed a first relay lens 46. In the light emitting surface side of this first relay lens 46 is disposed a reflection mirror 48. In the direction of propagation of the B-light reflected upon this reflection mirror 48 is disposed a second relay lens 50. On the light emitting surface side of the second relay lens 50 is disposed a reflection mirror 52. In the direction of propagation of the B-light reflected upon this reflection mirror 52 is disposed a third relay lens 54.

On the light emitting surface side of the third relay lens 54 is disposed the liquid crystal panel 18 for use of the B-light, and on the light emitting surface side of this liquid crystal panel 18 is disposed the color synthesizing prism 20. The color synthesizing prism 20 synthesizes a color image from the R-light, the G-light and the B-light, which are entered from the liquid crystal panels 14, 16 and 18, respectively, and thereby emitting the color image synthesized. On the color image emitting surface side of the color synthesizing prism 20 is disposed a projection lens 22, being made of a zoom lens, for example, and this projection lens 22 projects the color image incident thereon onto a screen not shown in the figure, enlargedly.

However, the color separation optic system 6 comprises the dichroic mirror 40 and 44 and the reflection mirror 42, and the relay optic system 8 comprises the first relay lens 46, the reflection mirror 48, the second relay lens 50, the reflection mirror 52 and the third relay lens 54.

Also, within the projection display 1, although the G-light and the B-light are separated, after separating the R-light at first, but according to the present invention, there is no restriction in the order of separation of the light emitted from the light source. From the light emitted from the light source, it is possible to separate the G-light or the B-light at first, and then thereafter the remaining two color component lights may be separated from each other. And, the light to be relayed should not be restricted to the B-light, but it may be the R-light or the G-light.

However, within the relay optic system 8, comparing to the optical path distance from the light source to the liquid crystal panel 14 for use of the R-light (hereinafter, this optical path distance is called by "an optical path length", and for example, the optical path length for the R-light is called by the R optical path length) and the optical path length (the G optical path length) from the light source to the liquid crystal panel 16 for use of the G-light, the optical length (the B optical path length) from the light source to the liquid crystal panel for use of the B-light is long, therefore this is to be adjusted.

In the vicinity of the first relay lens 46 on the B optical path is formed a hypothetical liquid crystal display image V, piling up with an image of each lens cell of the first array lens by means of the illumination optic system 4. The purpose of the relay optic system 8 is to relay (i.e., map) the hypothetical liquid crystal display image V onto the liquid crystal panel 18 for the B-light. Thus, a middle or intermediate lens of the relay optic system 8, i.e., the second relay lens 50 maps the hypothetical liquid crystal display image V onto the liquid crystal panel 18 for the B-light. In other words, the hypothetical liquid crystal display image V and the liquid crystal panel 18 are in the relationship between an object and an image thereof.

Also, a lens on an incident side of the relay optic system, i.e., the first relay lens 46 condenses the light passing through the hypothetical liquid crystal display image V on the second relay lens 50, so that the images uniform in the illuminance are formed all over the liquid crystal panel 18. Upon the second relay lens 50 is formed plural numbers of arc images, which are formed on the second array lens 34. Thus, the second array lens 34 and the second relay lens 50 are in the relationship between an object and an image thereof.

Also, on the first relay lens 46 is provided a rotation adjuster 150. This rotation adjuster 150 is for adjusting the offset on the illuminance distribution, by inclining the lens surface of the first relay lens 46 from the position in parallel with the panel surface of the liquid crystal panel 24 for the B-light.

Hereinafter, explanation will be made on details of an example of the rotation adjuster, by referring to FIGS. 2(*a*) to 2(*d*). However, the rotation adjuster should not be restricted only to that example shown in the figure, but the rotation adjuster 150 may be for rotating a holder holding the first relay lens 46 thereon around the Y-axis, so as to reduce the color unevenness in case if an offset is on the illuminance distribution in the X-axis direction. Also, the offset on the illuminance distribution is presumed that the offset is caused on the illuminance in the X-axis direction, due to eclipse of the light incident upon a light shielding portion (not shown in the figure), which is provided on the light incident side of the polarized light converting element 36 of the polarized light converting integrator.

Also, the orthogonal coordinate system to be used herein takes the Z-axis into a direction, into which the illumination light axis L extends, and takes the Y-axis into the direction in parallel with the direction of gravity on the plane perpendicular to the Z-axis. And, on the plane perpendicular to the Z-axis, the X-axis is taken into the direction perpendicular to the Y-axis. It is assumed that the orthogonal coordinate system, which will be used hereinafter, is same to that to be adopted herein.

The rotation adjuster 150 shown in FIG. 2(*a*) comprises a plate-like holder 152, on which the first relay lens is attached. On this holder 152 is attached the first relay lens 46, being held on a side edge portion thereof, and thickness of the holder 152 is thinner than the thickness defined between both lens surfaces of the first relay lens.

On an end surface of the holder 152 in the Y-axis direction is provided a column-like pin 154. On the contrary to this, as shown in FIG. 2(b), a groove 156 is formed on the base 2 for inserting the holder 152 therein, and within the groove 156 is formed an insertion hole 158 for inserting the pin 154 therein. And the holder 152 is inserted into the groove 156, while inserting the pin 154 into the insertion hole 158.

Since the insertion hole 158 is formed to be larger than the pin 154, in the diameter thereof, the holder 152 can rotate around an axis of the pin 154, i.e., around the rotation axis of the Y-axis.

Figure 2A:
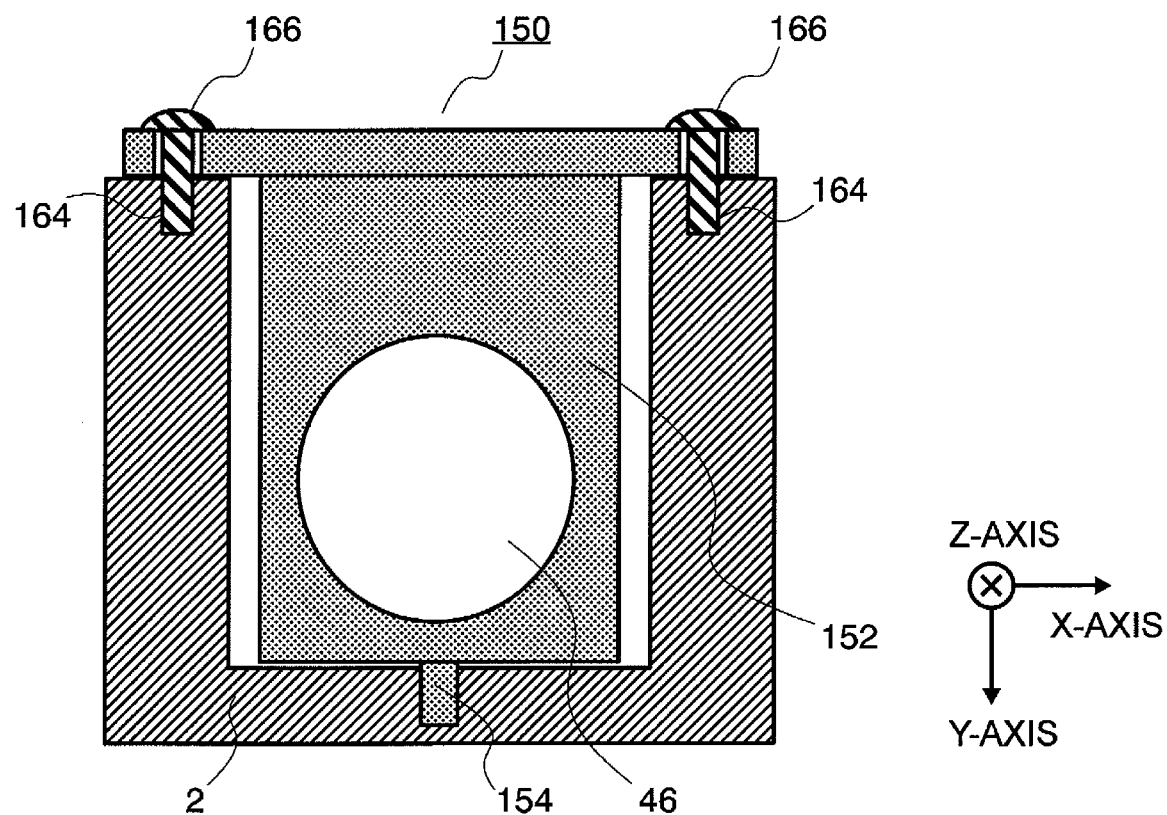
FIG. 2(a) is a front view for showing a principle portion of a rotation adjuster for a first relay lens, along the Z-axis direction.
Figure 2C:
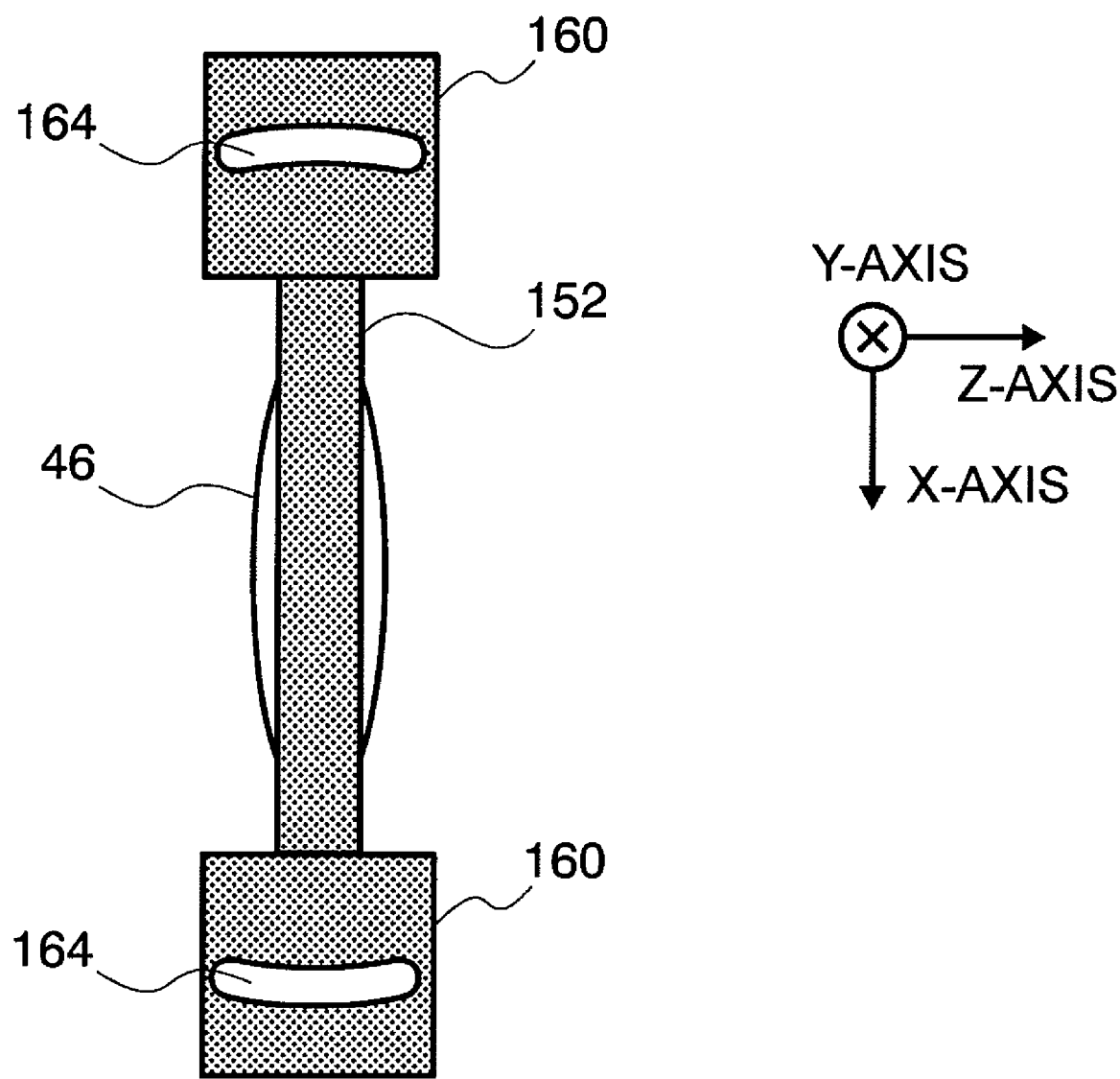
FIG. 2(c) is an upper view for showing a principle portion of an optical unit, on a portion of which the first relay lens is attached, along the Y direction.

Also, as is shown in FIG. 2(c), the holder 152 is provided with plate portions 160, each projecting into the X-axis direction, and on each of the plate portions 160 is formed an opening portion 164, respectively. Each of the opening portions 164 is formed in an arc-like shape of a circle, having a center portion on the Y-axis passing through the rotation axis of the pin 154.

Figure 2D:
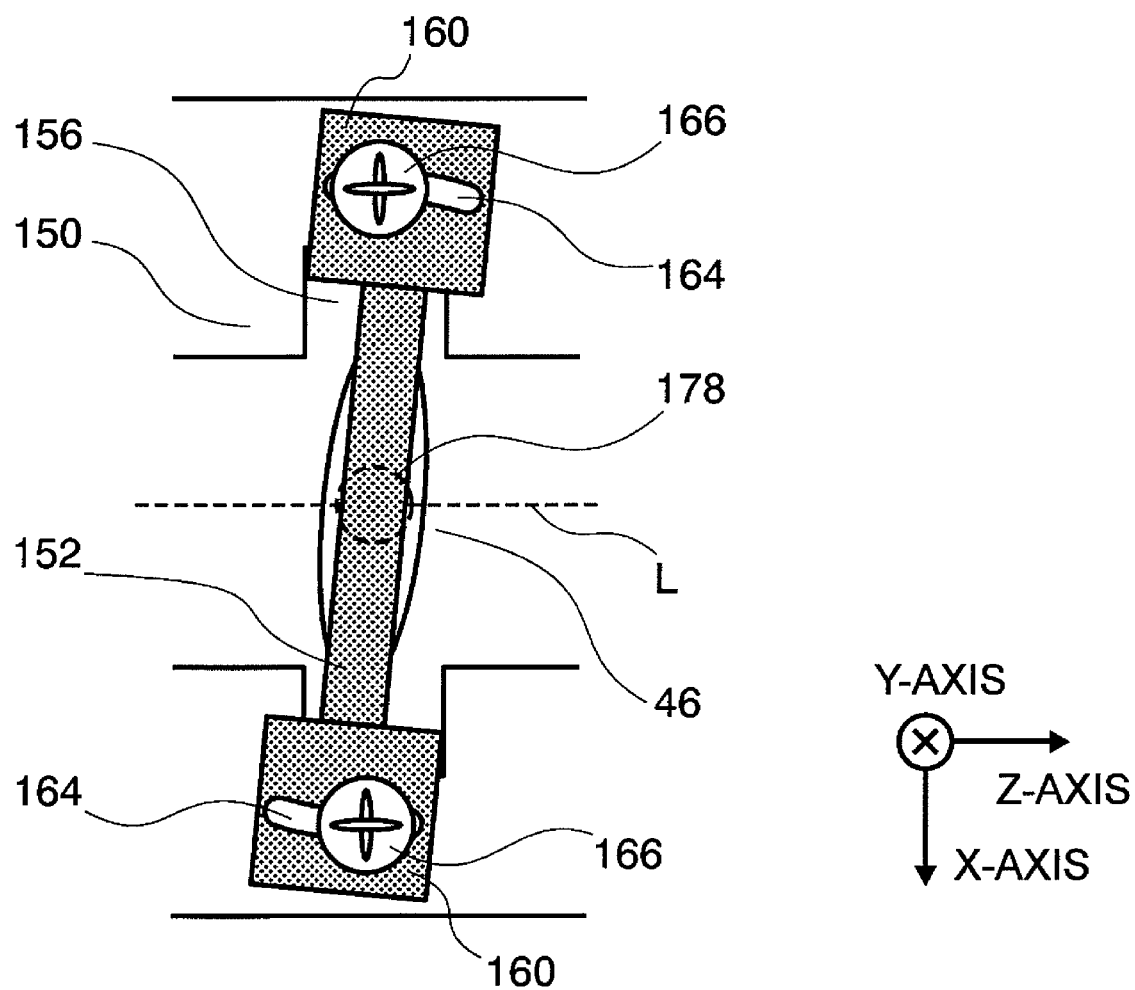
FIG. 2(d) is a front view for showing the rotation adjuster, which is attached within the optical unit, along the Y direction.

Also, as is shown in FIG. 2(a), on the base 2 are formed screw holes 164 corresponding to the opening portions 162, and the holder 152 is fixed on the base 2 by screwing screws 166, each penetrating through the opening portion 162 into the screw hole 164. Also, since the opening portion 162 is formed to be an arc of such the circle having the center portion on the Y-axis passing through the rotation axis of the pin 154, therefore, as is shown in FIG. 2(d), the holder 152 can be fixed but adjustable in the inclination angle thereof with respect to the illumination light axis L of the first relay lens 46, rotating around the pin 154 as the rotation axis, within a range of the opening portion 162, by means of the screw 166.

Next, explanation will be made on an example of the rotation adjuster for reducing the color unevenness in case where the offset is on the illuminance distribution in the Y-axis direction, by referring to FIGS. 3(a) to 3(d). However, the explanation about the portion(s) common with the rotation adjuster 150 mentioned above will be omitted.

Figure 3A:
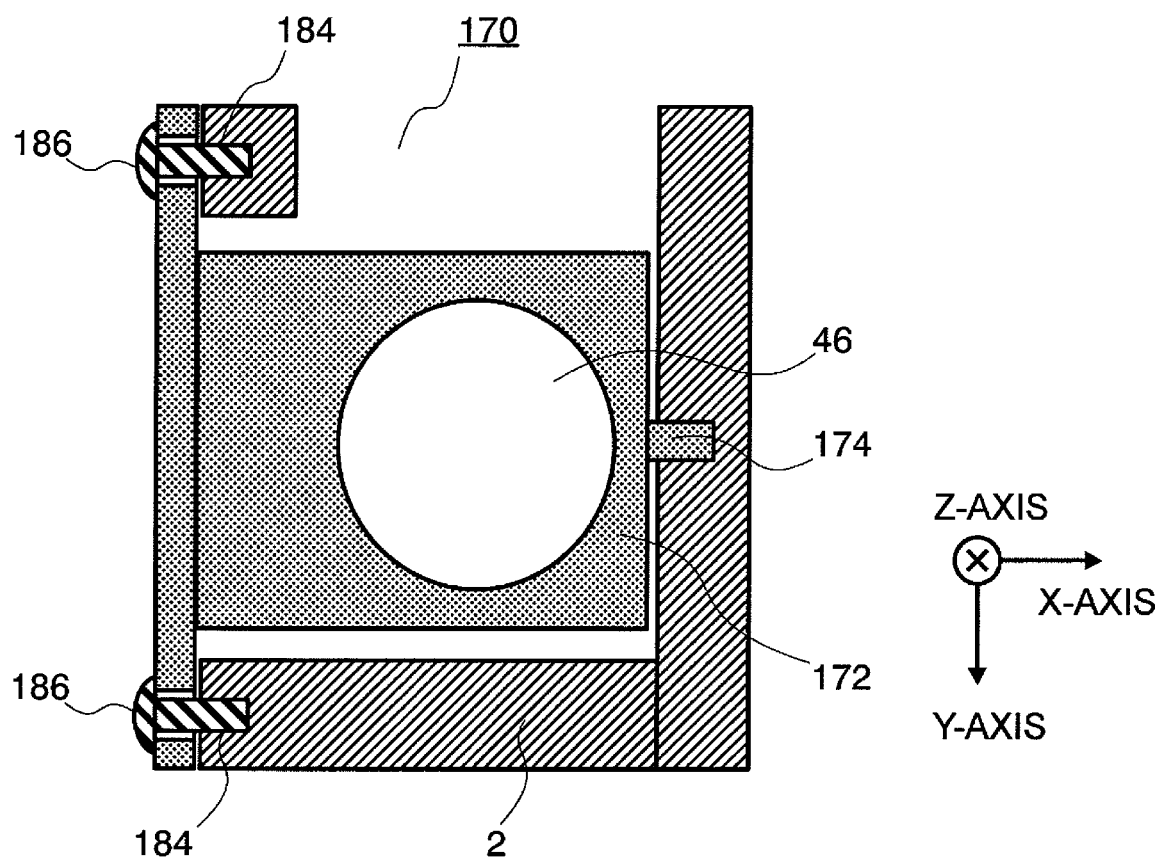
FIG. 3(a) is a front view for showing the principle portion of the rotation adjuster for the first relay lens, along the Z direction.

As is shown in FIG. 3(a), a rotation adjuster 170 is equipped with a plate-like holder 172. On one end surface located in the X-axis direction of the holder 172 is provided a column-like pin 174.

Figure 3B:
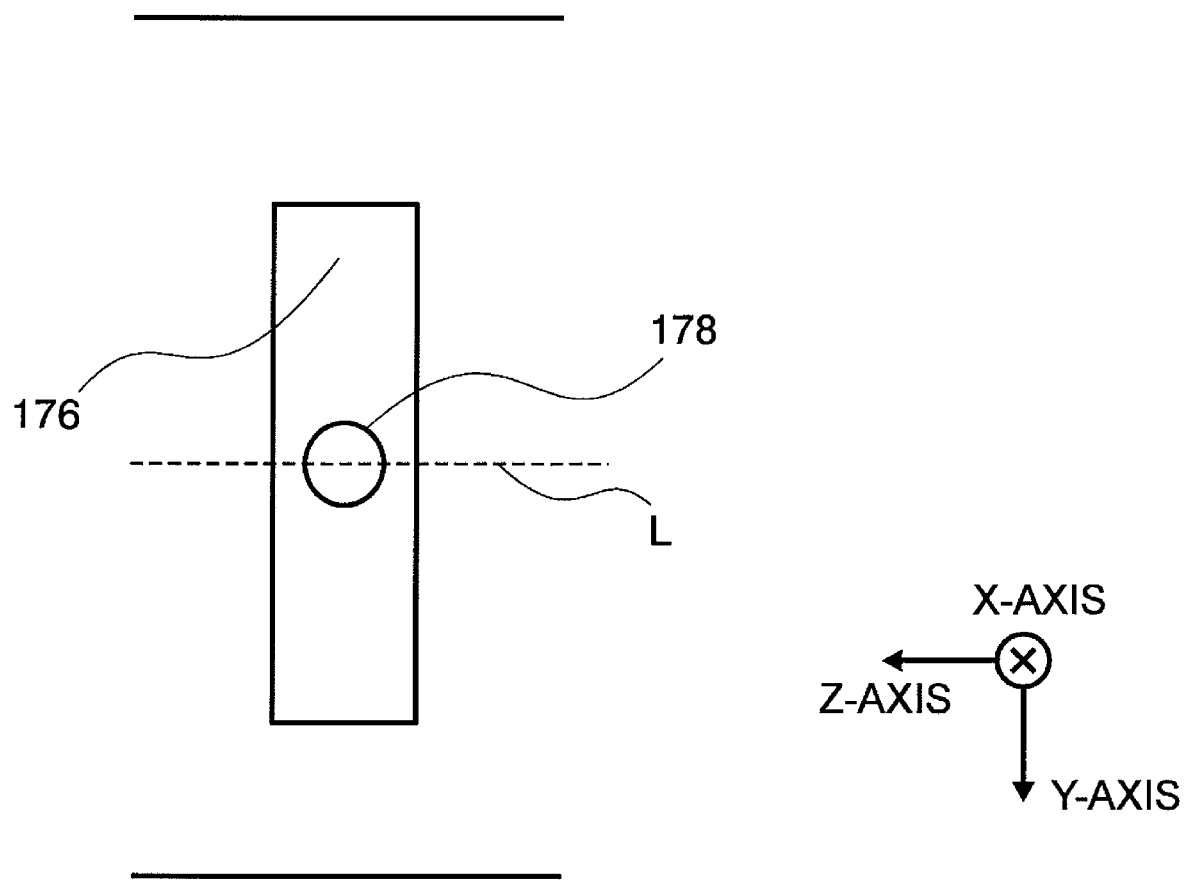
FIG. 3(b) is a side view for showing the principle portion of the rotation adjuster for the first relay lens, along the X direction.

On the contrary to this, on the base 2 is formed a groove 176, as shown in FIG. 3(b), for inserting the holder 172 therein, and within the groove 176 is formed an insertion hole 178 for inserting the pin 174 therein. Since the insertion hole 178 is formed to be larger than the pin 174, in the diameter thereof, the holder 152 can rotate around an axis of the pin 174, i.e., around the rotation axis of the X-axis.

Figure 3C:
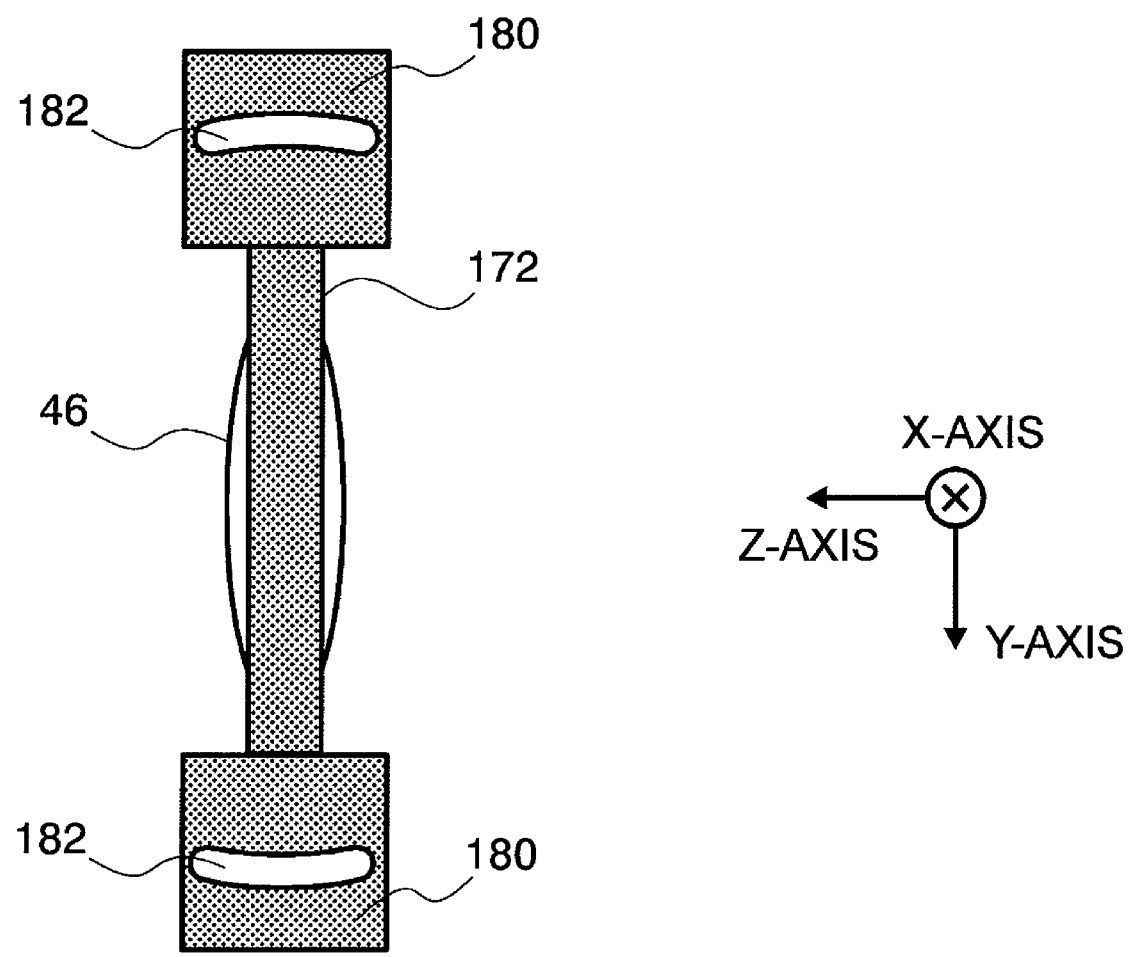
FIG. 3(c) is an upper view for showing the principle portion of the optical unit, on a portion of which the first relay lens is attached, along the X direction.

Also, as is shown in FIG. 3(c), the holder 172 is provided with plate portions 180 and 180, each projecting into the Y-axis direction, and on each of the plate portions 180 is formed an opening portion 182, respectively. Each of the opening portions 182 is formed in an arc-like shape of a circle, having a center portion on the X-axis passing through the rotation axis of the pin 174.

Figure 3D:
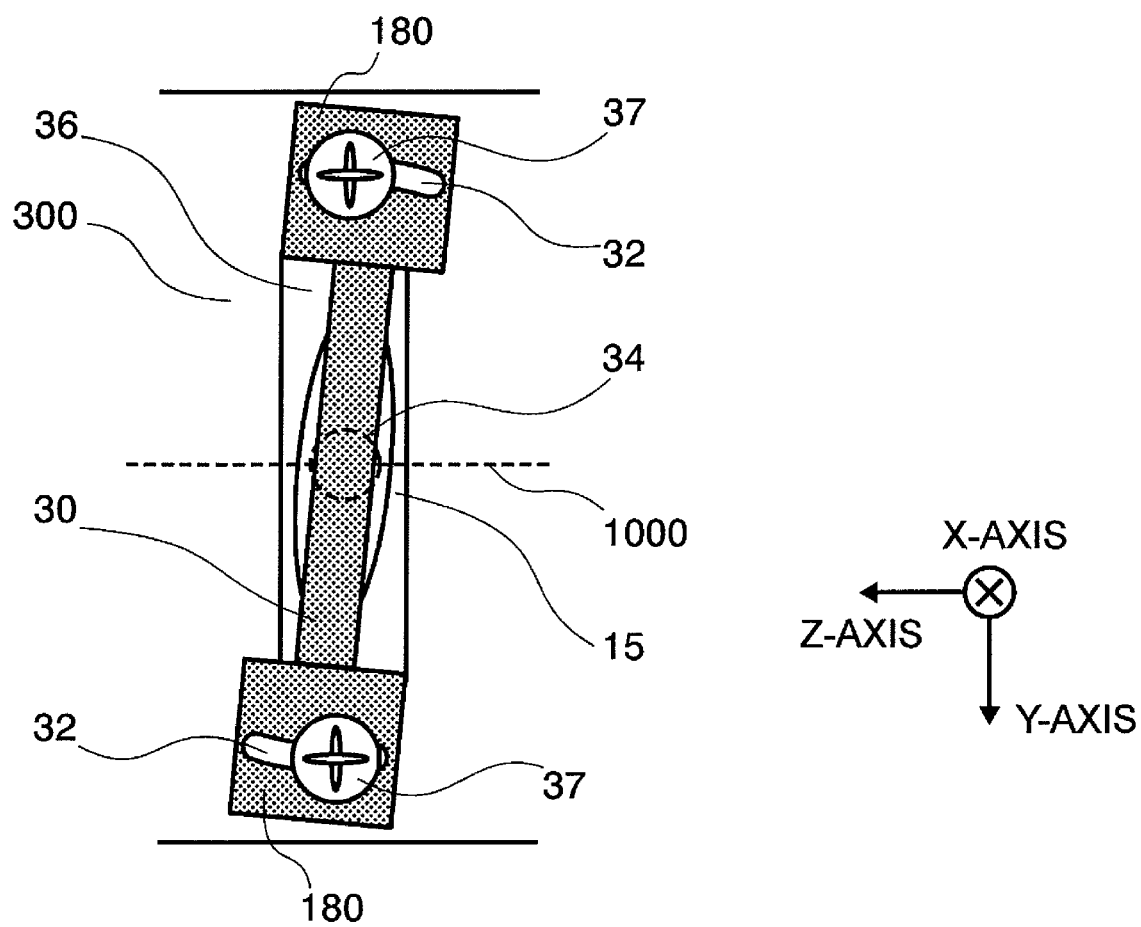
FIG. 3(d) is a side view for showing the rotation adjuster, which is attached within the optical unit, along the X direction.

Also, as is shown in FIG. 3(a), on the base 2 are formed screw holes 184 corresponding to the opening portions 182, and the holder 172 is fixed on the base 2 by screwing screws 186, each penetrating through the opening portion 182 into the screw hole 184. Also, since the opening portion 182 is formed to be an arc of such the circle having the center portion on the X-axis passing through the rotation axis of the pin 174, therefore, as is shown in FIG. 3(d), the holder 172 can be fixed adjustable in the inclination angle with respect to the illumination light axis L of the first relay lens 46, rotating around the pin 174 as the rotation axis, within a range of the opening portion 182, by means of the screws 186.

Next, explanation will be made on the principle for adjusting the offset on the illuminance distribution of the B-light, by adjustably rotating the first relay lens, in particular, in the case where there is the offset in the illuminance distribution in the X-axis direction.

Herein, for example, explanation will be made upon an assumption that there is the offset in the illuminance distribution in the X-axis direction, due to the eclipse of the light incident upon the light shielding portion (not shown in the figure), which is provided on the light incident side of the polarized light converting element 36 of the polarized light converting integrator.

Figure 4A:
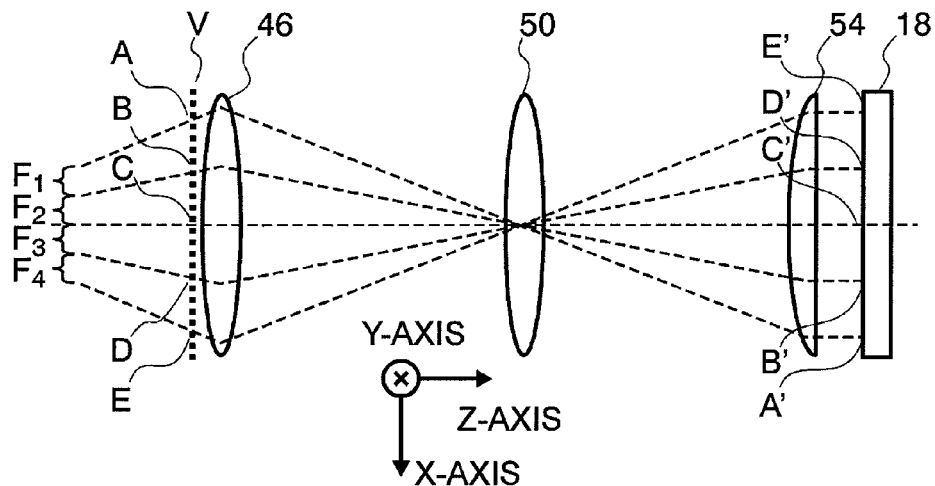
FIG. 4(a) is a view for showing a brief drawing illustrating a principle portion when disposing a lens surface of the first relay lens perpendicular to an axis of illumination light, and for showing the illuminance distribution in that case.
Figure 4B:
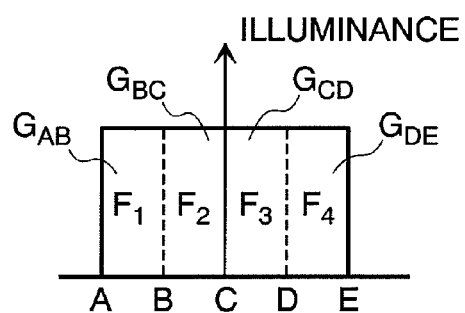
FIG. 4(b) is a view for showing the illuminance distribution upon a hypothetical picture, which is displayed on a liquid crystal display.
Figure 4C:
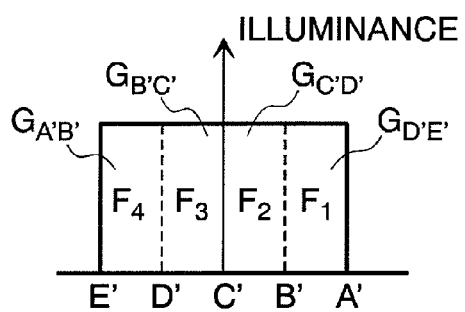
FIG. 4(c) is a view for showing the illuminance distribution upon a liquid crystal panel.
Figure 5A:
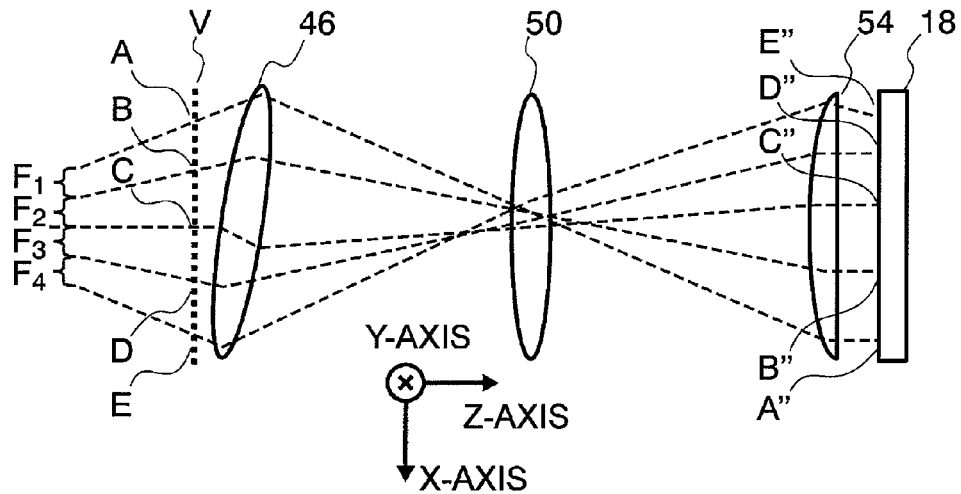
FIG. 5(a) is a view for showing a brief drawing illustrating a condition where the lens surface of the first relay lens is inclined by a predetermined angle to the axis of the illumination light.

In FIGS. 4(a) to 4(c) and 5(a) to 5(c) are XZ cross-section views for showing the principle portions, enlagedly, starting from the first relay lens 46 of the relay optic system to the liquid crystal panel 18 for use of the B-light, aligning them on a straight line, including the illumination light axis L therein. FIG. 4(a) is a diagram for showing light rays in the case where the first relay lens 46 is disposed so that the lens surface of the is in perpendicular to the illumination light axis L, and FIG. 5(a) is a diagram for showing the light rays when rotating the first relay lens 46 around the Y-axis on the illumination light axis L.

In FIGS. 4(a) to 4(c), the light incident upon the first relay lens 46 is condensed by means of the first relay lens 46 and forms a focal point in the vicinity of the second relay lens 50. After passing through the second relay lens 50, the divergent light comes to in parallel with the illumination light axis L through the third relay lens 54, to be incident upon the liquid crystal panel 18. The second lens array 50 achieves a function of mapping an image of the hypothetical liquid crystal display image V formed in the vicinity of the first relay lens 46, which is uniform or equalized in the illuminance in the X-axis direction, onto the liquid crystal panel 18.

Herein, assuming that arbitrary points are A, B, C, D and E, on the XZ cross-section, including the illumination light axis L therein, upon a rectangular-shaped surface of the hypothetical liquid crystal display image V, similar to the liquid crystal panel, which is formed in the vicinity on the surface of the first relay lens 46. And, on the rectangular-shaped surface of the hypothetical liquid crystal display image V, it is assumed that regions divided by straight lines extending from the points A, B, C, D and E in parallel with the X axis are presented by giving marks $G_{AB}$, $G_{BC}$, $G_{CD}$, and $G_{DE}$, respectively. For example, the $G_{AB}$ presents a region between the point A and the point B. Also, it is assumed that the light intensities included within the regions $G_{AB}$, $G_{BC}$, $G_{CD}$, and $G_{DE}$ can be expressed by marks F1, F2, F3 and F4, respectively. And, it is also assumed that the points at which the lights passing through the points A, B, C, D and E on the hypothetical liquid crystal display image V intersect the liquid crystal panel 24 are A', B', C', D' and E' in FIG. 4(a), and are A", B", C", D" and E" in FIG. 5(a), respectively.

Assuming that the distances between A and B, B and C, C and D, and D and E are equal to one another, since the illuminance distribution are uniform or equalized on the hypothetical liquid crystal display image V, as is the illuminance distribution shown in FIG. 4(b), then the light intensities F1, F2, F3 and F4 are equal to one another. Accordingly, the relationships among the respective illuminances in the regions $G_{AB}$, $G_{BC}$, $G_{CD}$, and $G_{DE}$ can be expressed by the following Equation 1, as shown in FIG. 4(b):

$$F1 \div S_{AB} = F2 \div S_{BC} = F3 S_{CD} = F4 \div S_{DE} \qquad \text{(Eq. 1)}$$

Where, $S_{AB}$, $S_{BC}$, $S_{CD}$ and $S_{DE}$ indicate areas of the regions $G_{AB}$, $G_{BC}$, $G_{CD}$, and $G_{DE}$, respectively.

In case when the lens surface of the first relay lens 46 is not inclined with respect to the illumination light axis L, then the distances between A' and B' (A'B'), B' and C' (B'C'), C' and D' (C'D'), and D' and E' (D'E') are equal to one another. Accordingly, the illuminances in the regions $G_{A'B'}$, $G_{B'C'}$, $G_{C'D'}$, and $G_{D'E'}$ on the liquid crystal panel, corresponding to the regions $G_{AB}$, $G_{BC}$, $G_{CD}$, and $G_{DE}$, are as shown in FIG. 4(c), and they can be expressed by the following Equation 2:

$$F1 \div S_{A'B'} = F2 \div S_{B'C'} = F3 \div S_{C'D'} = F4 \div S_{D'E'} \quad \text{(Eq. 2)}$$

Where, the areas of the regions $G_{A'B'}$, $G_{B'C'}$, $G_{C'D'}$, and $G_{D'E'}$ are indicated by $S_{A'B'}$, $S_{B'C'}$, $S_{C'D'}$, and $S_{D'E'}$, respectively.

However, the horizontal axis of the graph shown in FIG. 4(b) means the position in the X-axis direction on the hypothetical liquid crystal display image V, and the vertical axis thereof shows the height or intensity of illuminance at the position in the X-axis direction on the hypothetical liquid crystal display image V. Also, the horizontal axis of the graph shown in FIG. 4(c) means the position in the X-axis direction on the liquid crystal display 18, and the vertical axis thereof shows the height or intensity of illuminance at the position in the X-axis direction on the liquid crystal display 18.

Next, the illuminance distribution is shown, in particular, in case when the lens surface of the first relay lens 46 is inclined with respect to the illumination light axis L. When inclining the first relay lens 46 as is shown in FIG. 5(a), since the distances between A and B, B and C, C and D, and D and E are equal to one another, then the illuminance distributions on the hypothetical liquid crystal display image V are uniform, as the illuminance distribution shown in FIG. 5(b); however, the distances between A" and B" (A"B"), B" and C" (B"C"), C" and D" (C"D") and D" and E" (D"E") are not equal to, then A"B">B"C">C"D">D"E". Since all the light intensities F1, F2, F3 and F4 are equal to one another, then it is possible to express the illuminance distribution upon the liquid crystal panel by the following Equation 3, i.e., obtaining uneven distribution, as the illuminance distribution shown in FIG. 5(c).

$$F1 \div S_{A''B''} < F2 \div S_{B''C''} < F3 \div S_{C''D''} < F4 \div S_{D''E''} \quad \text{(Eq. 3)}$$

Where, the areas the regions $G_{A''B''}$, $G_{B''C''}$, $G_{C''D''}$ and $G_{D''E''}$ are indicated by $S_{A''B''}$, $S_{B''C''}$, $S_{C''D''}$ and $S_{D''E''}$, respectively.

Figure 5B:
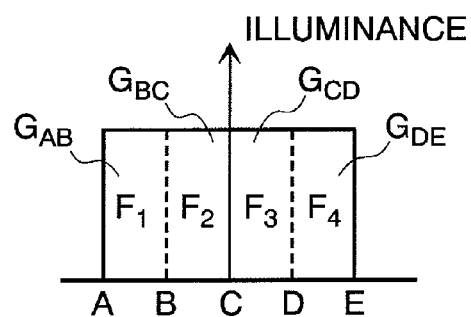
FIG. 5(b) is a view for showing the illuminance distribution upon the hypothetical picture, which is displayed on the liquid crystal display.
Figure 5C:
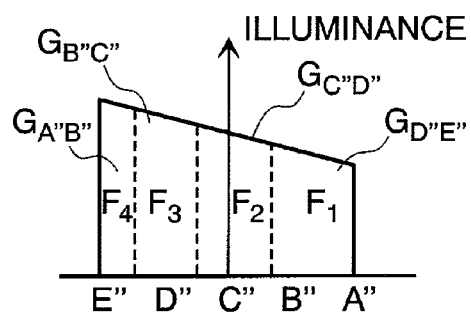
FIG. 5(c) is a view for showing the illuminance distribution upon the liquid crystal panel.
Figure 6A:
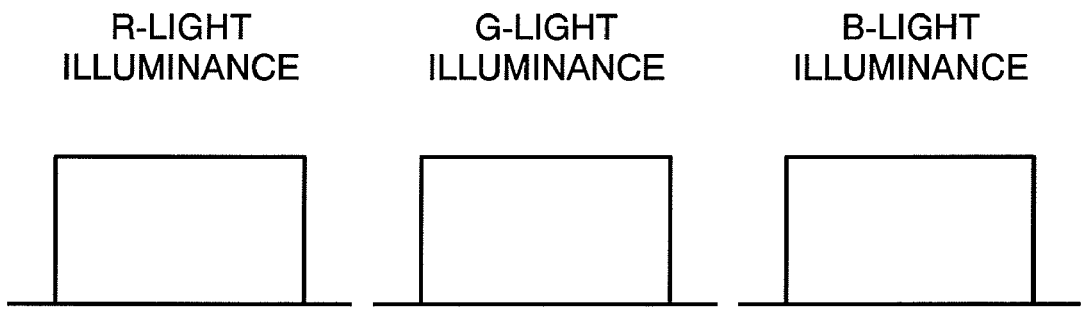
FIG. 6(a) is a view for showing condition of the illuminance distribution for each of the color lights, in case when no offset is generated in the illuminance distribution on a light source side.
Figure 6B:
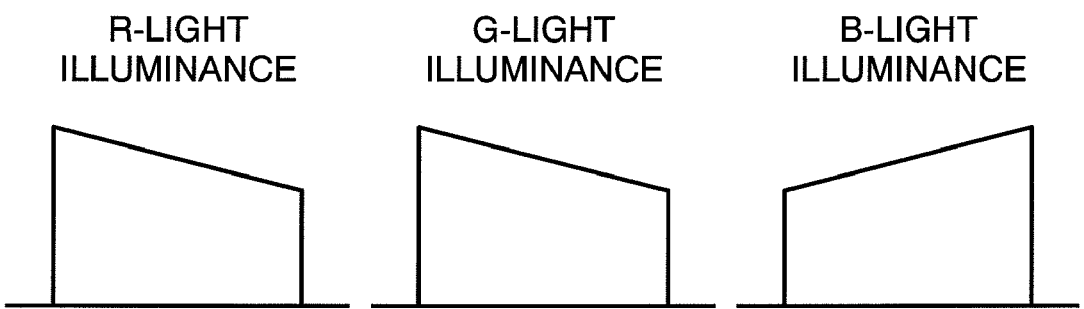
FIG. 6(b) is a view for showing condition of the illuminance distribution for each of the color lights, in case when an offset is generated in the illuminance distribution on a light source side.
Figure 6C:
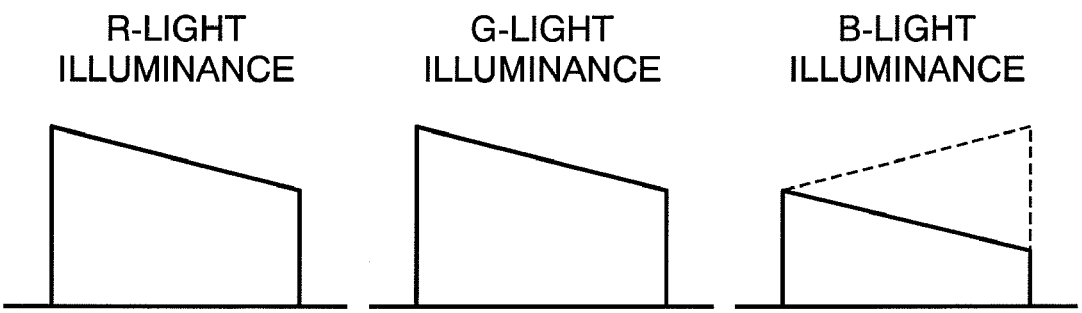
FIG. 6(c) is view for showing condition of the illuminance distribution, in case when adjustment is made on the offset on the illuminance distribution, by shielding a portion of B-light when the offset is generated in the illuminance distribution on the light source side.

However, the horizontal axis of the graph shown in FIG. 5(b) means the position in the X-axis direction on the hypothetical liquid crystal display image V, and the vertical axis thereof shows the height or intensity of illuminance at the position in the X-axis direction on the hypothetical liquid crystal display image V. Also, the horizontal axis of the graph shown in FIG. 5(c) means the position in the X-axis direction on the liquid crystal display 18, and the vertical axis thereof shows the height or intensity of illuminance at the position in the X-axis direction on the liquid crystal display 18.

Then, it is possible to adjust an inclination of the illuminance distribution of the light projected on the liquid crystal panel 18, by inclining the first relay lens 46 with respect to the illumination light axis L. Thus, even if the color unevenness is generated because the light intensities F1, F2, F3 and F4 are not uniform, due to the unevenness of the lamp light source, etc., it is possible to adjust or compensate the configuration of the illuminance distribution of the B-light to be equal to that of the illuminance distribution of the G light, and thereby to reduce the color unevenness, but without reducing the light intensity thereof.

As was mentioned above, it is possible to keep a color balance, without reducing the light intensity, and also to reduce the color unevenness without deteriorating the color purity of the white color.

Although the explanation was given on the case where there are the offsets on the illuminance distribution up/down (vertically) and left/right (horizontally); however, the present invention should not be limited only to such case that the offsets on the illuminance distribution are in those directions, but it can be also applied into the case where the offset of the illuminance distribution lies in the intermediate direction between the Y-axis direction and the X-axis direction.

In case where the offset of the illuminance distribution lies in the intermediate direction between the Y-axis direction and the X-axis direction, it is sufficient to provide the rotation adjuster so that the rotation axis thereof is positioned in the direction perpendicular to the direction, in which the offset lies.

Next, explanation will be made on functions of the projection display, according to the present embodiment. However, hereinafter, it is assumed to reduce the color unevenness, which is generated due to the offset on the illuminance distribution in the X-axis direction.

When turning ON the electric power source of the projection display 1, then the lights emitted from the lamp 30 reflected on the reflection surface of the reflector irradiate on the first array lens 32. The lights irradiating upon the first array lens 32 are separated into plural numbers of lights through the plural numbers of lens cells of the first array lens 32, and are irradiated upon the second array lens 34. The lights irradiating upon the second array lens 34, after transmitting through the plural numbers of lens cells of the second array lens 34, are irradiated upon the polarized light converting element 36.

The lights irradiating upon the polarized light converting element 36 are changed in the polarization direction thereof, to be aligned into the predetermined direction, and thereafter are irradiated upon the condenser lens 38. The lights irradiated upon the condenser lens 38 are irradiated upon the dichroic mirror 40, after being condensed. Among the lights irradiating upon the dichroic mirror 40, the R-light is reflected thereupon while the G-light and the B-light transmit therethrough.

The R-light reflected upon the dichroic mirror 40 is irradiated upon the condenser lens 10 after being reflected upon the reflection mirror 42. The R-light condensed by the condenser lens 10 is irradiated upon the liquid crystal panel 14, and the R-light transmitting through the liquid crystal panel 14 is incident upon the color synthesizing prism 20.

On the other hand, the G-light and the B-light transmitting through the dichroic mirror 40 are irradiated upon the dichroic mirror 44. Between the G-light and the B-light irradiating upon the dichroic mirror 44, the G-light is reflected upon the dichroic mirror 44, while the B-light transmits through the dichroic mirror 44. The G-light reflected upon the dichroic mirror 44 is irradiated upon the condenser lens 12, and after being condensed, it is irradiated upon the liquid crystal panel 16. The G-light being irradiated upon the liquid crystal panel 16 and transmitting therethrough is irradiated upon the color synthesizing prism 20.

The B-light transmitting through the dichroic mirror 44 is irradiated upon the first relay lens 46. The first relay lens 46 is inclined by the predetermined angle with respect to the illumination light axis L, in advance, by adjusting the rotation adjuster 150.

Thus, in case where the B-light has the illuminance distribution opposite to the illuminance distributions, left and right, as shown in FIG. 5(b), among the illuminance distributions obtained on the screen when no inclining is made on the first relay lens 32 with respect to the illumination light axis L by means of the rotation adjuster 150, then adjustment is made on the rotation adjuster 150, so as to incline the first relay lens 46 by the predetermined angle with respect to the illumination light axis L. And, the holder 152 is rotated to determine the inclination angle of the first relay lens 46 with respect to the illumination light axis, in such manner that the illuminance distribution of the B-light is similar to those of the illuminance distributions of the G-light and the B-light, as shown in FIG. 5(a), when projecting the B-light on the screen, and thereafter the position of the holder is fixed by means of the screws 166.

As was mentioned above, the B-light being adjusted on the illuminance distribution through the first relay lens 46, which is inclined by the predetermined angle with respect to the illumination light axis L and transmitting through the first relay lens 46 is condensed in the vicinity of the second relay lens 50, and then, after passing through the second relay lens it is irradiated, it is irradiated upon the third relay lens 54 while diverging from. The B-light irradiated upon the third relay lens 54, after being made in parallel with the illumination light axis L through that third relay lens 54, is irradiated upon the liquid crystal panel 18, and the B-light transmitting through the liquid crystal panel 18 is incident upon the color synthesizing prism 20.

The R-light, the G-light and the B-light transmitting through the liquid crystal panels, after being synthesized into a color image by means of the color synthesizing prism 20, i.e., the color synthesizing element, they pass through the projection lens 22 and reach onto the screen not shown in the figure. The optical image, being formed through the light intensity modulation upon the liquid crystal panels 14, 16 and 18, is projected on the screen by means of the projection lens 22, enlargedly.

As was mentioned above, with the projection display 1, according to the present embodiment, even if there is the offset on the illuminance distribution, it is possible to reduce the color unevenness generated due to the offset on the illuminance distribution, while preventing the color purity of the white color from being deteriorated, through inclining the first relay lens, i.e., being the incident side lens of the relay optic system, by the predetermined angle with respect to the illumination light axis L, by means of the rotation adjuster 150, i.e., rotationally adjusting it into a predetermined direction, thereby adjusting the illuminance distribution of the light, which is projected upon the liquid crystal panel 18.

As was mentioned above, according to the present invention, it is possible to provide the projection display enabling to reduce the color unevenness, but without deteriorating the color purity of the white color, even when the offset is caused on the illuminance distribution on the light source side.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A projection display, for modulating lights into an optical image through an image display element, thereby projecting the optical image from a projection lens, enlargedly, comprising:

a light source, which is configured to emit the lights;

an optical integrator, which is configured to equalize illuminance distribution of the lights from said light source;

a color separation optic system, which is configured to separate the lights emitted from said optical integrator into a plural number of light components which pass along respective optical paths to the image display element;

a relay optic system disposed in the optical path of one of the separated light components so as to provide an optical path length of the one of the separated light components from the light source to the image display element thereof which is longer than an optical path length of other separated light components from the light source to the image display element thereof;

said relay optic system having a plural number of relay lenses, each of which is configured to sequentially relay the light of the one of the separated light components by said color separation optic system; and a rotation adjuster, which is provided in at least any one of said plural number of relay lenses, and configured to adjust an inclination angle thereof, with respect to a light axis of the lights emitted from said light source.

2. The projection display, as described in the claim 1, wherein said rotation adjuster is provided in the relay lens, which is disposed at a position, at which an optical path length from said light source is at shortest, among said plural number of relay lenses.

3. The projection display, as described in the claim 1, wherein said rotation adjuster rotates around a X-axis or Y-axis.

4. The projection display, as described in claim 1, wherein said relay optic system is disposed only in the optical path of the one of the separated light components having the longer optical path length with respect to the other separated light components.

5. The projection display, as described in claim 4, wherein the one of the separated light components passing through said relay optic system is B-light.

6. A projection display, for modulating lights into an optical image through an image display element, thereby projecting the optical image from a projection lens, enlargedly, comprising:

a light source;

an optical integrator, which is configured to equalize illuminance distribution of the lights from said light source;

a color separation optic system, which is configured to separate the lights emitted from said optical integrator into a plural number of light components which pass along respective optical paths to the image display element;

a relay optic system disposed in the optical path of one of the separated light components so as to provide an optical path length of the one of the separated light components from the light source to the image display element thereof which is longer than an optical path length of other separated light components from the light source to the image display element thereof;

said relay optic system having first, second and third relay lenses, being provided in an order that said light passes through, each of which is configured to sequentially relay the light of the one of the separated light components by said color separation optic system; and a rotation adjuster, which is provided in said first relay lens of said relay optic system and configured to adjust an inclination angle thereof, with respect to an axis of illumination lights emitted from said light source.

7. The projection display, as described in the claim 6, wherein said rotation adjuster rotates around a X-axis or Y-axis.

8. The projection display, as described in claim 6, wherein said relay optic system is disposed only in the optical path of the one of the separated light components having the longer optical path length with respect to the other separated light components.

9. The projection display, as described in claim 8, wherein the one of the separated light components passing through said relay optic system is B-light.

10. A projection display, comprising:
a light source, which is configured to emit the lights;
a reflector, which is configured to reflect the lights from said light source;
an optical integrator, which is configured to equalize illuminance distribution of the lights reflected upon said reflector;
a color separation optic system, which is configured to separate the lights emitted from said optical integrator into a plural number of light components which pass along respective optical paths;
a plural number of image display elements, being provided along the respective optical paths corresponding to each of the plural number of color light components, which are separated within said color separation optic system;
a color synthesizing element, which is configured to synthesize the lights emitting from said plural number of image display elements;
a projection lens, which is configured to project the lights from said color synthesizing element;
a relay optic system disposed in the optical path of one of the separated light components so as to provide an optical path length of the one of the separated light components from the light source to the corresponding image display element thereof which is longer than an optical path length of other separated light components from the light source to the corresponding image display elements thereof;
said relay optic system having first, second and third relay lenses, being sequentially disposed on the optical path of the one of the separated light components; and
a rotation adjuster, which is provided in said first relay lens of said relay optic system and configured to adjust an inclination angle thereof, with respect to an axis of illumination lights emitted from said light source.

11. The projection display, as described in the claim 10, wherein said rotation adjuster rotates around a X-axis or Y-axis.

12. The projection display, as described in the claim 10, wherein the one of the separated light components sequentially passes through said relay optic system in an order of said first relay lens, said second relay lens and said third relay lens.

13. The projection display, as described in the claim 10, wherein the one of the separated light components passing through said relay optic system is B-light.

14. The projection display, as described in claim 10, wherein said relay optic system is disposed only in the optical path of the one of the separated light components having the longer optical path length with respect to the other separated light components.

* * * * *